United States Patent [19]

Underdahl

[11] 4,285,114
[45] Aug. 25, 1981

[54] METHOD FOR TRANSFERRING CIRCULAR PAPER FILTERS FROM A STACK OF SUCH FILTERS INTO A COFFEE MAKER BASKET

[76] Inventor: Alfred J. Underdahl, 402 Pleasant Dr., Hastings, Minn. 55033

[21] Appl. No.: 94,447

[22] Filed: Nov. 15, 1979

[51] Int. Cl.³ .......................................... B23P 11/02
[52] U.S. Cl. ..................................... 29/451; 99/295; 271/18.1; 294/1 R
[58] Field of Search .......................... 99/295; 29/451; 271/18.1, 18.2; 294/1 R

[56] References Cited

U.S. PATENT DOCUMENTS

| | | | |
|---|---|---|---|
| 1,510,564 | 10/1924 | Stockfleth | 294/1 R |
| 3,104,018 | 9/1963 | Booth | 294/1 R |
| 3,726,520 | 4/1973 | Doi | 271/18.1 |
| 3,737,973 | 6/1973 | Stawski | 29/451 |
| 4,073,530 | 2/1978 | Seidler | 294/1 R |

*Primary Examiner*—Harold D. Whitehead

*Attorney, Agent, or Firm*—Peterson, Palmatier, Sturm & Sjoquist, Ltd.

[57] ABSTRACT

The applicator includes a plastic disc having a central hole therein. Integral with the disc and extending from the upper side thereof is a tubular handle, the bore of the handle being in alignment or registry with the hole in the plastic disc. By means of the handle the disc can be rotatively oscillated against the uppermost paper filter of a stack of such filters so as to induce electrostatic charges thereon with the consequence that the filter clings to the lower side of the disc. The disc is slightly smaller in diameter than the diameter of the paper filters to be transferred, and the peripheral diameter of the paper filters is slightly greater than the diameter of the coffee maker basket. In this way, when the plastic disc and the filter being electrostatically carried thereby is inserted into the coffee maker basket, the peripheral edge of the filter is deflected upwardly, the frictional engagement causing the filter to remain in the basket when the plastic disc is retracted.

3 Claims, 9 Drawing Figures

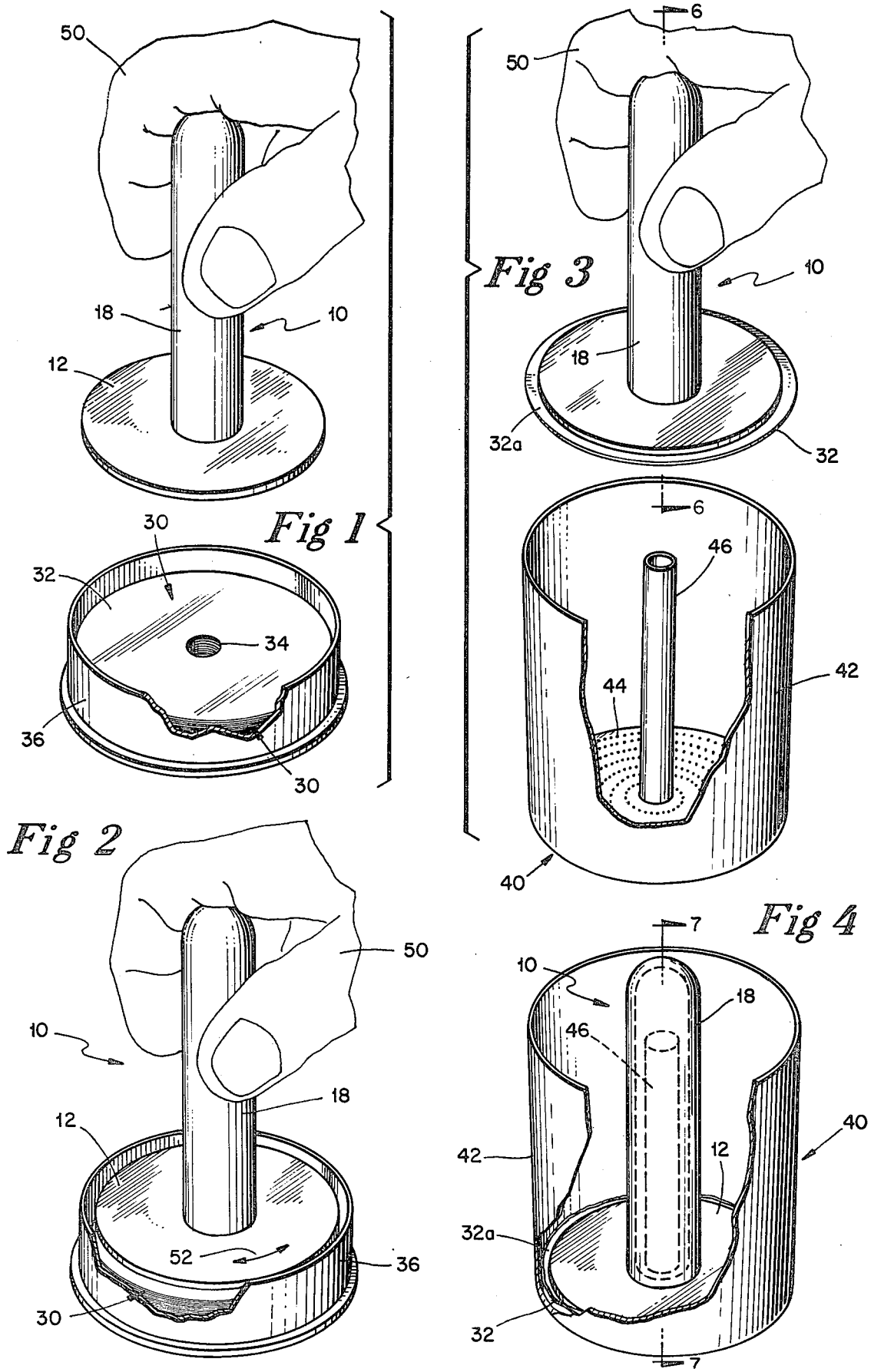

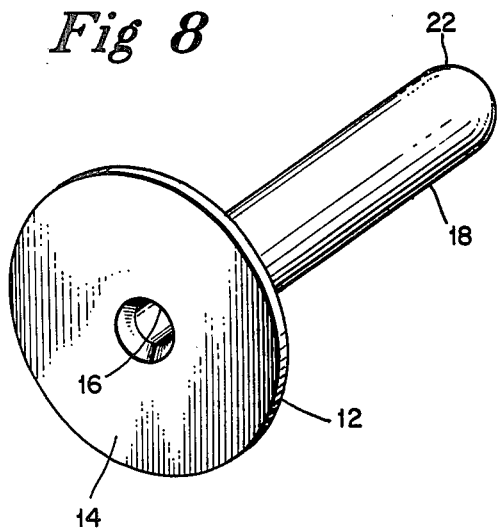
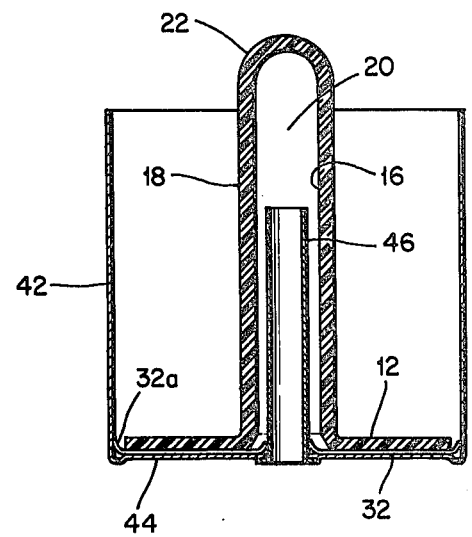
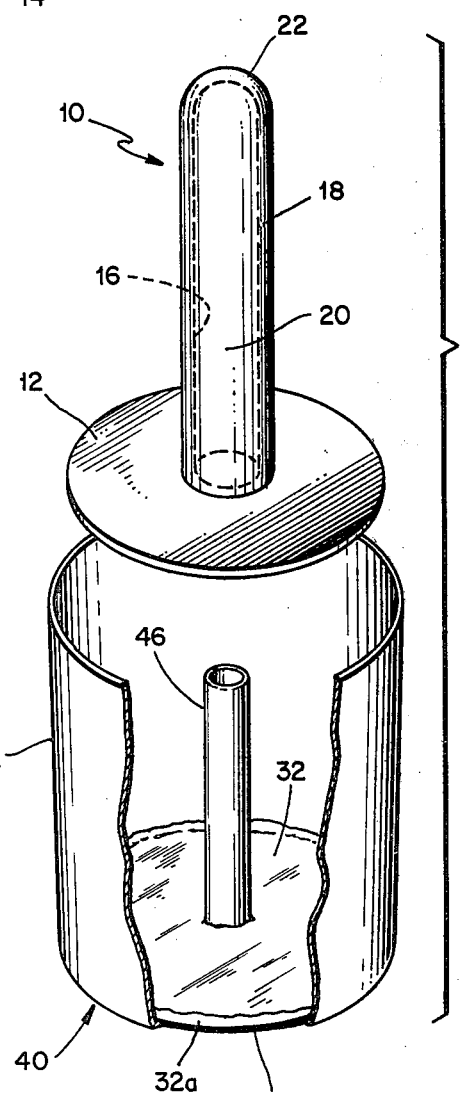
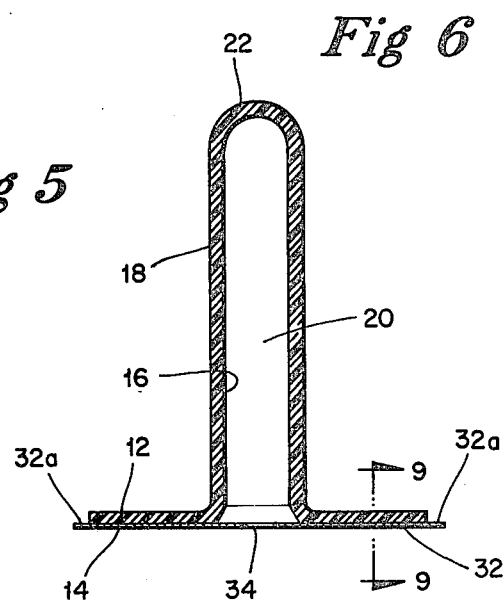
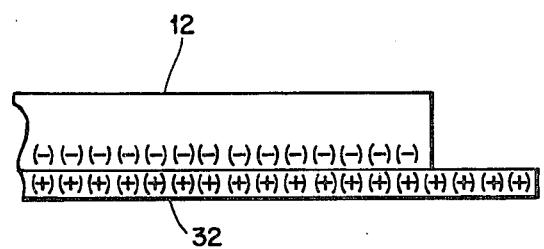

METHOD FOR TRANSFERRING CIRCULAR PAPER FILTERS FROM A STACK OF SUCH FILTERS INTO A COFFEE MAKER BASKET

BACKGROUND OF THE INVENTION

1. Field of the Invention

This invention relates generally to coffee makers, and pertains more particularly to an applicator and method for transferring circular paper filters from a stack or supply of such filters into the perforated coffee maker basket.

2. Description of the Prior Art

A number of coffee makers, particularly those of the percolator type, make use of flat circular filters of fibrous material, usually paper. These filters have a centrally located hole so that the filters can be manually inserted downwardly into the interior of a perforated coffee maker basket. When properly inserted, the basket tube projects upwardly through the centrally disposed hole. In some types of filters of the envisaged type there is a U-shaped slit forming a tab or flap that is flexed upwardly when the filter is manually moved downwardly within the coffee maker basket.

Inasmuch as a stack of circular filter papers tend to stick together, it becomes rather bothersome to remove a single filter from the top of a stack of such filters. Frequently, two or more filters are removed, which is costly over a period of time because only individual filters are needed when brewing coffee. To some degree, the flow of coffee downwardly through a number of filters is slowed or retarded. In any event, the ordinary user of coffee makers finds it sufficiently troublesome as far as not separating the filters so the end result is that more filters are used than are needed.

No known device exists which enables the user to pick up a single paper filter from a stack of such filters and transfer it conveniently into a perforated coffee maker basket. This, as indicated above, is done manually by the individual user.

SUMMARY OF THE INVENTION

Accordingly, an important object of my invention is to provide a device or applicator which will pick up a single or individual circular paper filter from a supply of such filters, doing so in a manner such that the single filter can be transferred from the stack or supply to the coffee maker basket in which it is to be used in the brewing of coffee.

Another object of the invention is to provide an applicator that is quite inexpensive to fabricate, thereby encouraging its widespread use. Actually, an aim of the invention is to provide an applicator that is sufficiently inexpensive that it can be employed as a premium item, either being given away with the purchase of a particular item, such as an electric coffee maker or a can of coffee, or it can be sold at a price that is very low, such much so as to be virtually insignificant to a would-be purchaser.

Yet another object of the invention is to provide an applicator that will be aesthetically attractive so as to also encourage its use. In this regard, it is planned that the applicator will be made of a suitable plastic and that the plastic can be of various colors that will enhance its appearance.

Still further, an object of the invention is to provide an applicator for transferring circular paper filters from a supply into a coffee maker basket that is very compact and which will take up but little space when not being used.

Also, the invention has for an object an applicator that will transfer circular paper filters into a coffee maker basket very rapidly.

Yet another object is to provide an applicator that will perform its transferring function very effectively so that the filter when inserted in the coffee maker basket will fully cover the perforated bottom thereof with the result that coffee grounds do not pass downwardly around the filter, such as when the filter is improperly placed manually within the coffee maker basket.

Another object of the invention is to provide a device that will pick up but a single filter from a stack or supply of such filters. Also, the invention has for an object the easy release of the filter once it has been transferred into the coffee maker basket.

Additionally, an object is to permit the transferring of a circular paper filter into a coffee maker basket irrespective of whether the basket is within the coffee maker or not. More specifically, users may wish to remove the basket from the coffee maker, placing it on the kitchen countertop, and then putting the filter in the basket and also placing the requisite amount of coffee into the basket on top of the filter, all in contradistinction to leaving the basket within the coffee maker and under such circumstances putting the filter in place and the coffee on top of the filter while the basket is in the coffee maker.

Briefly, my invention contemplates the inducing of electrostatic charges on a conventional circular coffee maker filter, these being of fibrous material such as paper. A plastic disc is integral with a tubular handle, the plastic disc having a centrally located hole which is in alignment or registry with the bore of the tubular handle. All that the user need do is to rotate back and forth, that is oscillate the disc by means of the handle so that the underside of the disc frictionally bears against the uppermost filter of a stack of such filters. The induced electrostatic charges cause the uppermost filter to cling or releasably adhere to the underside of the disc so that the disc and the filter attracted thereto can be inserted downwardly into a conventional coffee maker basket. The tube extending upwardly from the perforated bottom of the coffee maker basket extends into the bore of the tubular handle as the disc and filter are moved downwardly into the basket. The diameter of the plastic disc is made somewhat less than the diameter of the circular paper filters so that a peripheral marginal edge projects beyond the edge of the circular disc. The filters are somewhat larger in diameter than the inside diameter of the basket so that the marginal edge of the filter in each instance is flexed upwardly as the plastic disc is moved downwardly. This produces a frictional fit so that the filter remains within the basket when the applicator is withdrawn or retracted.

BRIEF DESCRIPTION OF THE DRAWINGS

FIG. 1 is a perspective exploded view depicting my applicator in a raised position with respect to a supply of circular filters;

FIG. 2 is a perspective view after the applicator has been lowered against the uppermost filter, the double-headed arrow indicating the rotative oscillation that is utilized when practicing the invention;

FIG. 3 is another exploded perspective view, this view showing the filter that has been picked up from the stack in FIG. 2 and just prior to lowering the applicator and the filter into the coffee maker basket therebeneath;

FIG. 4 is a perspective view with the applicator fully positioned within the coffee maker basket and just prior to the retraction or withdrawal of my applicator from the basket;

FIG. 5 is an exploded perspective view showing the applicator after it has been withdrawn from the basket an also depicting the filter that has been deposited in the basket;

FIG. 6 is a sectional view taken in the direction of line 6—6 of FIG. 3 which shows the cross sectional makeup of the applicator with a filter clinging thereto;

FIG. 7 is a sectional view taken in the direction of line 7—7 of FIG. 4 which shows the cross-sectional make-up of the applicator positioned in the coffee-maker basket;

FIG. 8 is a perspective view of the applicator itself, the view being toward the bottom side that engages the filter to be picked up and transferred, and FIG. 9 is a greatly enlarged fragmentary sectional view taken in the direction of line 9—9 of FIG. 6 for the purpose of indicating the electrostatic charges that are induced on the filter via the rotative oscillation of the plastic disc forming part of my applicator.

DESCRIPTION OF THE PREFERRED EMBODIMENT

The applicator exemplifying my invention has been generally denoted by the reference numeral 10. In this regard, the applicator 10 comprises a plastic disc 12, such as acrylic or Teflon. The plastic disc 12 has a flat bottom surface 14 provided with a central hole 16.

The applicator 10 further includes a tubular plastic handle 18 having a hollow interior or bore 20 plus a domed upper end 22.

It will be appreciated that the plastic disc 12 and the tubular plastic handle 18 constitute a unit. More specifically, it is planned that the disc 12 and handle 18 be injection molded in one piece. However, the handle 20 may be extruded and then adhesively bonded to the disc 12. It is important, though, that the bore 20 of the handle 18 be aligned or in registry with the hole 16 in the disc 12.

At this time, attention is directed to FIG. 1 in which a stack or supply of circular coffee filters 30 is depicted. The stack or supply 30 includes a number of individual filters 32. These filters 32 are of a fibrous material, usually paper. Normally, each filter 32 has a hole 34 formed therein, but sometimes a U-shaped slit is made to form a flap that forms the hole in actual use. The stack or supply of filter papers, which has been indicated generally by the reference numeral 30, is contained in a circular tray 36.

Although the drawings do not picture a coffee maker, it will be understand that coffee makers of the contemplated type include a metal basket 40, such as of aluminum, having a cylindrical side wall 42 and a perforated bottom wall 44. A central tube 46 extends upwardly from the bottom wall 44 for the accommodation of the pump tube (not shown) which, as its name indicates, pumps the hot water up so that it is sprayed radially outwardly and falls gravitationally onto the ground coffee contained within the basket 40.

Describing now the manner in which the applicator 10 is used, attention is directed to FIG. 1 where a person's hand 50 has been partially shown, the fingers grasping the tubular plastic handle 18 of the applicator 10. In the position illustrated in FIG. 1, the user has picked up the applicator 10 and is in the process of lowering the plastic disc 12 in the direction of the stack or supply of filter papers 30 so as the pick up the topmost filter 32.

FIG. 2 shows the plastic disc 12 of my applicator 10 with its bottom surface contacting the upper surface of the topmost filter 32. When lowered against the filter 32, the user then rotatively oscillates the disc 12 in opposite directions as indicated by double-headed arrow 52. All that the user need do is to rotate the handle 18 about its longitudinal or vertical axis, using his fingers to accomplish this. Only several oscillations are needed in order to induce electrostatic charges onto the uppermost filter 32. Inasmuch as filters 32 are usually of paper, and assuming that the disc 12 is of plastic, such as acrylic, then the result is that positive charges collect on the filter 32 and negative charges accumulate on the disc 12. Since unlike electrical charges attract, the filter 32 clings to the underside or bottom surface 14 of the disc 12 in the manner shown in FIGS. 3 and 6.

It will be recognized that this clinging condition is realized from the rotative oscillations made with the applicator 10 in the position depicted in FIG. 2. Thus, when the user lifts up the applicator 10, the filter 32 remains electrostatically adhered to as can be appreciated from FIG. 3, and also from FIG. 6 since FIG. 6 is a sectional view taken in the direction of line 6—6 of FIG. 3.

It makes no difference whether the stack or supply of filter papers 30 is located close to the coffee maker basket 40, for the induced electrostatic charges will remain indefinitely, or at least for a pronounced period of time, the period being dependent on the humidity and also the particular plastic material of which the applicator 10 is fabricated.

At any rate, the applicator 10, together with the filter 32 clinging to the bottom side 14 of the disc 12, is lowered into the basket 40. FIG. 4 shows the applicator fully lowered. At this time, it should be understood that the filter 32, as are all of the other filters contained in the stack 30 is of slightly larger diameter than the disc 12. The marginal portion of the filter 32 extending beyond the peripheral edge of the disc 12 has been labeled as 32a. It should further be noted that the diameter of the filter 32 is also somewhat larger than the inside diameter of the cylindrical casing 42 of the basket 40. Hence, as can be understood to some extent from FIG. 4, and to an even greater degree from FIG. 7, the marginal portion 32a is deflected upwardly so that it is frictionally retained within the basket 40. Once the filter 32 has been pressed against the bottom wall 44, then the applicator is simply retracted or withdrawn, the filter 32 remaining in place. Whereas the marginal portion 32a frictionally holds the filter 32 within the basket 40, it can be appreciated from FIG. 7 that frequently the central hole 34 is somewhat smaller than the tube 46 which provides an additional frictional retention. It should be recognized, though, that with the proper size of filter 32, my invention assures that it will be "seated" properly so that the filter 32 overlies the entire perforated bottom wall 44 with the consequence that the filter 32 very effectively performs its filtering action. When manually positioned, as hereto done, a person can be careless so that a portion of the bottom wall 44 remains exposed and coffee grounds can pass downwardly through the perforations into the lower portion of the coffee maker, coffer grounds in brewed coffee always being somewhat objectionable.

While the disc 12 has been mentioned as being of plastic, particularly acrylic inasmuch as acrylic is a relatively inexpensive plastic material, it will be recognized that other dielectric materials can be utilized in the inducing of electrostatic charges into a fibrous filter, such as that indicated by the reference numeral 32.

I claim:

1. A method of transferring circular coffee maker filters of fibrous material from a stack of such filters into a coffee maker basket comprising the steps of rotatively oscillating a dielectric disc against the uppermost filter of said stack to induce electrostatic charges on said filter to cause said filter to cling to said disc, and inserting said disc into the basket with said filter attracted thereto to deposit said filter in said basket.

2. A method in accordance with claim 1 in which said disc is circular and has a centrally disposed hole therein, and a tubular handle extending from the side of said disc opposite the side thereof that contacts the filter, whereby said oscillating step is performed through the agency of said handle, and the tube of the coffee maker basket is received within the bore of said tubular handle when said disc is inserted into said basket.

3. A method in accordance with claim 2 in which said basket has a cylindrical side wall and a perforated bottom, and said filter has a larger diameter than the diameter of said circular disc and also a larger diameter than the diameter of said cylindrical wall so that the marginal edge of said filter is deflected upwardly when said disc is inserted into said basket.

* * * * *